United States Patent
Cui et al.

(10) Patent No.: US 11,825,413 B2
(45) Date of Patent: Nov. 21, 2023

(54) DISCONTINUOUS RECEPTION GROUPS FOR LICENSED AND UNLICENSED BANDS

(71) Applicant: Apple Inc., Cupertino, CA (US)

(72) Inventors: Jie Cui, San Jose, CA (US); Yang Tang, San Jose, CA (US); Dawei Zhang, Saratoga, CA (US); Hong He, San Jose, CA (US); Manasa Raghavan, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 22 days.

(21) Appl. No.: 17/345,647

(22) Filed: Jun. 11, 2021

(65) Prior Publication Data

US 2022/0086752 A1    Mar. 17, 2022

Related U.S. Application Data

(60) Provisional application No. 63/079,323, filed on Sep. 16, 2020.

(51) Int. Cl.
| | |
|---|---|
| *H04W 52/02* | (2009.01) |
| *H04W 76/16* | (2018.01) |
| *H04W 8/24* | (2009.01) |
| *H04W 76/28* | (2018.01) |

(52) U.S. Cl.
CPC ......... *H04W 52/0216* (2013.01); *H04W 8/24* (2013.01); *H04W 52/0235* (2013.01); *H04W 76/16* (2018.02); *H04W 76/28* (2018.02)

(58) Field of Classification Search
CPC ......... H04W 52/0216; H04W 52/0235; H04W 8/24; H04W 76/16; H04W 76/28; H04W 16/14; Y02D 30/70
See application file for complete search history.

(56) References Cited

U.S. PATENT DOCUMENTS

| | | | |
|---|---|---|---|
| 2016/0007350 A1* | 1/2016 | Xiong | H04W 24/10 370/252 |
| 2016/0227571 A1* | 8/2016 | Baek | H04L 5/0053 |
| 2018/0110047 A1* | 4/2018 | Babaei | H04W 72/0446 |
| 2019/0364469 A1* | 11/2019 | Siomina | H04W 36/06 |
| 2020/0045768 A1* | 2/2020 | He | H04W 76/28 |
| 2020/0221290 A1* | 7/2020 | Wiemann | H04W 8/24 |
| 2020/0351731 A1* | 11/2020 | Kim | H04W 36/0072 |
| 2021/0029768 A1* | 1/2021 | Shih | H04W 76/30 |
| 2021/0298114 A1* | 9/2021 | Nam | H04W 52/0229 |

FOREIGN PATENT DOCUMENTS

WO    WO-2016097978 A1 *    6/2016    ........ H04W 52/0216

* cited by examiner

*Primary Examiner* — Ricardo H Castaneyra
(74) *Attorney, Agent, or Firm* — Kilpatrick Townsend & Stockton LLP

(57) ABSTRACT

The present application relates to devices and components including apparatus, systems, and methods to provide DRX groups for licensed and unlicensed bands. For example, a first DRX group can be used in association with an NR licensed band of FR1, a second DRX group can be used in association with NR-U of FR1, and a third DRX group can be used in association with FR2. In this way, power savings of DRX groups can be granular to the level of licensed and unlicensed bands.

20 Claims, 11 Drawing Sheets

DISCONTINUOUS RECEPTION GROUPS FOR LICENSED AND UNLICENSED BANDS

CROSS-REFERENCES TO RELATED APPLICATIONS

This application claims the benefit of U.S. Provisional Patent Application No. 63/079,323, filed Sep. 16, 2020, which is hereby incorporated by reference in its entirety for all purposes.

BACKGROUND

A base station may configure a user equipment (UE) to use discontinuous reception (DRX). DRX is a mechanism in which the UE transitions into a sleep mode for a certain period of time and wakes up for another period of time. Generally, DRX reduces the power consumption of the UE.

DETAILED DESCRIPTION

Figure 1:
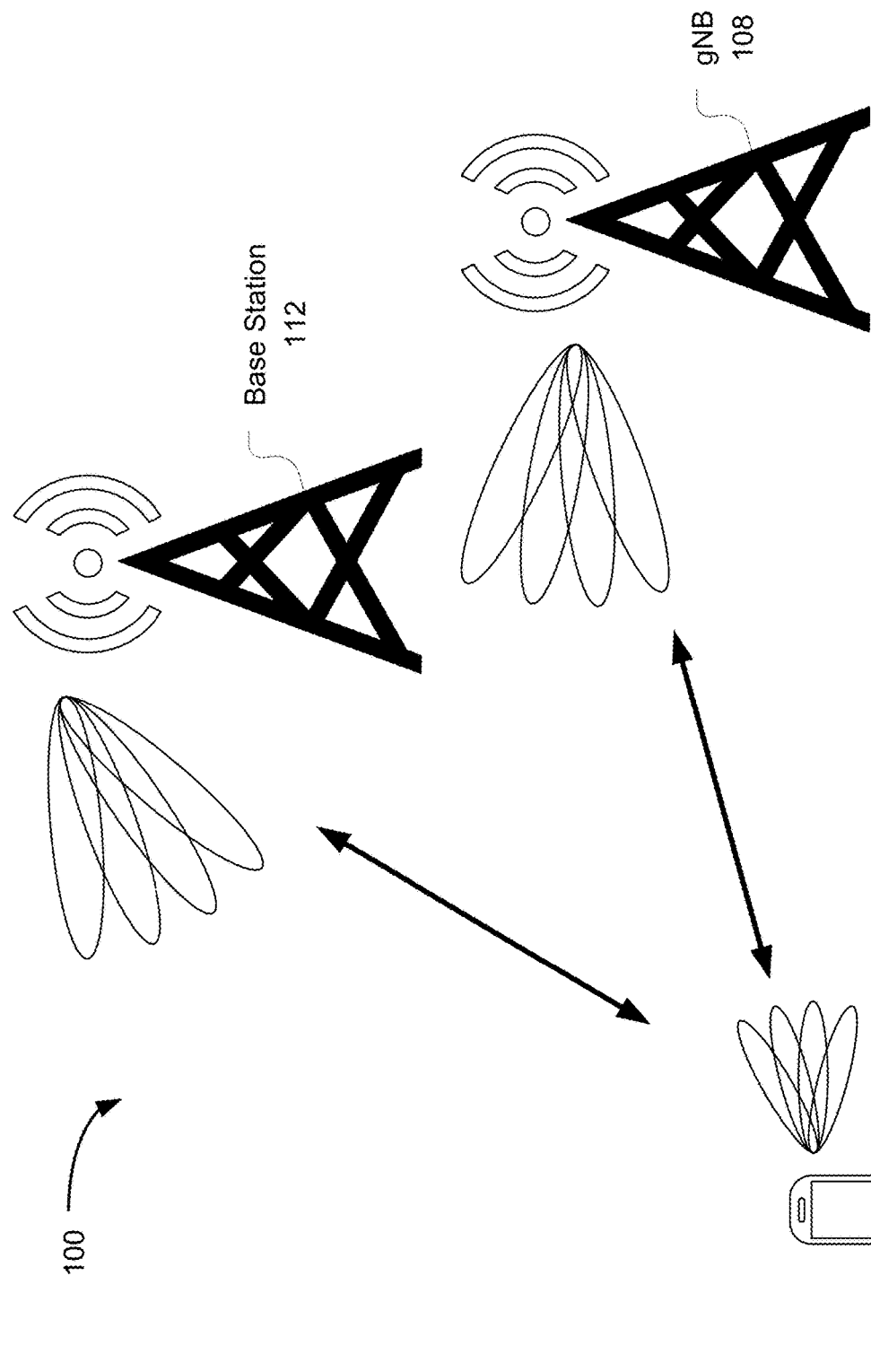
FIG. 1 illustrates an example of a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred as a gNodeB (gNB), eNodeB (eNB), access point, etc.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, 12 resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI, to inform the UE 104 of these QCL relationships.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

The UE 104 may select a beam to receive downlink transmissions based on SSBs and CSI-RSs. The UE 104, while in a radio resource control (RRC)-idle mode, may perform an initial acquisition during a random access procedure using SSBs and physical random access channel (PRACH) preambles to establish uplink and downlink beam pairs. These initial beam pairs may correspond to relatively wide beams. The UE 104 may then enter an RRC-connected mode and initiate beam refinement procedures to select beams that are more directional and have higher gain. The beam refinement procedures may be based on CSI-RS.

As further illustrated in FIG. 1, the network environment 100 may further include a base station 112 with which the UE 104 may also connect. The base station 112 supports the same radio access technology (RAT) as the gNB 108 (e.g., the base station 112 is also a gNB). Additionally or alternatively, the base station 112 supports a different RAT (e.g., Long-Term Evolution (LTE) eNB). In an example, the UE 104 support dual connectivity (DC), whereby the UE 104 can connect and exchange data simultaneously with the gNB 108 and the base station 112.

Using RRC, a UE, such as the UE 104, may be configured with DRX parameters to implement DRX functionality. The DRX functionality controls the UE's PDCCH monitoring activity for the MAC entity. When in RRC_CONNECTED, if DRX is configured, for all the activated serving cells, the MAC entity may monitor the PDCCH discontinuously using the DRX functionality.

In Evolved-Universal Terrestrial Radio Access-New Radio Dual Connectivity (EN-DC), NR-E-UTRA Dual Connectivity (NE-DC), and NR-DC using frequency range 1 (FR1) band (between 40 Megahertz (MHz) and 7,125 MHz) and frequency range 2 (FR2) band (between 24,250 MHz and 52,600 MHz) (NR-DC(FR1+FR2)), the network may configure the UE 104 with two individual DRXs (e.g., DRX groups) to use for different cell groups (for example, a primary cell group (PCG) and a secondary cell group (SCG)) to save the UE power. EN-DC allows the UE 104 to simultaneously exchange data with an LTE base station through a PCG and an NR base station through a SCG. In this dual connectivity mode, the UE 104 may use the LTE PCG for control/data plane and the NR SCG for a user plane. In NE-DC, the NR base station (e.g., gNB) may provide the PCG and the LTE base station (e.g., eNB) may provide the SCG. In NR-DC(FR1+FR2), a first NR base station (e.g., gNB) may provide the PCG in FR1 (or in FR2) and a second NR base station (e.g., gNB) may provide the SCG in FR2 (or in FR1). In EN-DC, NE-DC, and NR-DC(FR1+FR2), the UE can follow different DRX configurations on different cell groups to perform data reception and/or transmission and mobility measurement.

Generally, serving cells may be configured by RRC in two DRX groups. One DRX group is associated with the FR1 band. Another DRX group is associated with the FR2 band. When two DRX groups are configured, each DRX group is configured by RRC with its own set of parameters: drx-onDurationTimer and drx-InactivityTimer. Further, the two DRX groups are configured to share following parameter values: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In NR DC, no interruption is allowed when both a primary cell (PCell) and a primary secondary cell (PSCell) are in DRX. Interruption can occur when the use of resources for radio access on a frequency band or a set of component carriers belonging to the frequency band changes (e.g., powered on or off), and the change impacts the use of resources for radio access on another frequency band or a set of component carriers thereof.

In new radio (NR), the FR1 band includes a licensed band and an unlicensed band. The NR unlicensed band (NR-U) may be used in multiple scenarios. In a first scenario (Scenario A), carrier aggregation may be used between a new radio licensed band (PCell) and NR-U (SCell). The NR-U SCell may be used for both downlink (DL) and uplink (UL), or DL only. In a second scenario (Scenario B), dual connectivity may be used between an LTE licensed band (PCell) and NR-U (PSCell). In a third scenario (Scenario C), NR-U may be used as stand-alone. In a fourth scenario (Scenario D), a stand-alone NR cell may be used in unlicensed band (NR-U) and UL in licensed band. In a fifth scenario (Scenario E), dual connectivity may be used between an NR licensed band and NR-U.

Embodiments of the present disclosure enable using different DRX groups, not only in association with FR1 and FR2, but also in association with NR-U of FR1. In other words, a first DRX group can be used in association with an NR licensed band of FR1, a second DRX group can be used in association with NR-U of FR1, and a third DRX group can be used in association with FR2. In this way, the advantages of DRX groups, including power savings, can be extended to and become granular to the level of licensed and unlicensed bands. In various embodiments, a separated DRX group for NR-U component carriers (NRU-CCs) (e.g. a DRX group that is configured specifically for the NRU-CCs) can be used in addition to DRX groups for licensed CCs, including both FR1 and FR2 CCs, for at least scenario A, scenario B, and scenario E. A UE capability exchange between a UE and a base station to indicate the support by the UE of separated DRX group for NR-U CCs and the interruption assumption and related UE behavior can be implemented according to the embodiments.

Figure 2:
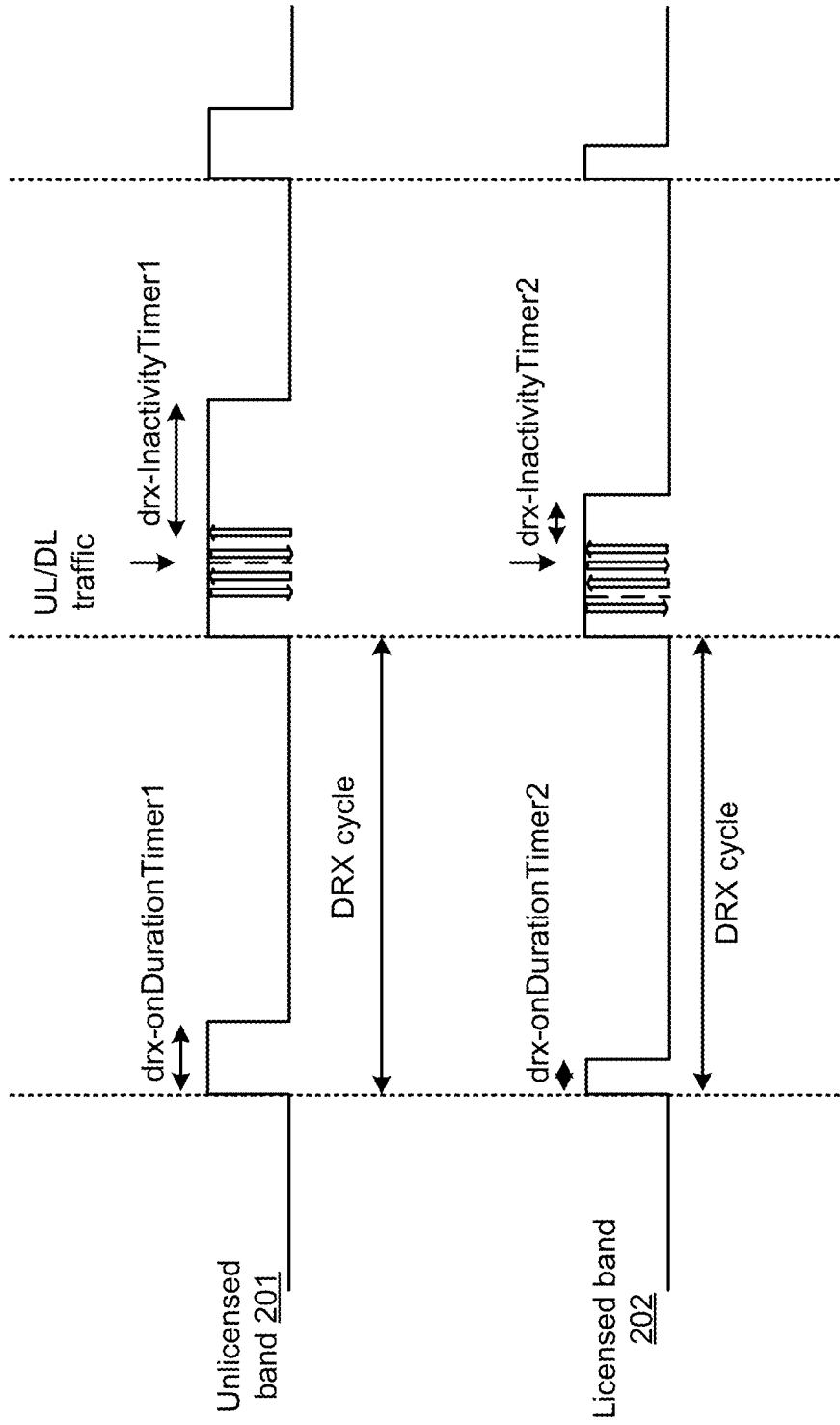
FIG. 2 illustrates an example of using two DRX groups associated with licensed and unlicensed bands for physical downlink control channel (PDCCH) monitoring in accordance with some embodiments.

FIG. 2 illustrates an example of using two DRX groups associated with licensed and unlicensed bands for PDCCH monitoring in accordance with some embodiments. The unlicensed band 201 can be used for radio access that implements a first RAT. For instance, in the case of NR, the unlicensed band 201 is NR-U. The licensed band 202 can be used for radio access that implements the first RAT or a second, different RAT, such as LTE. For instance, in the case of NR, the licensed band 201 belongs to FR1 or FR2. In the case of LTE, the licensed band is an LTE licensed band of a PCell. Generally, in the case of NR only (e.g., the same RAT is used for the two bands 201 and 202) and in the case of NR and LTE as the two RATs, the unlicensed band 201 and licensed band 202 cover scenario A, scenario B, and scenario E.

In the illustration of FIG. 2, a first DRX group is configured for the unlicensed band 201, and a second DRX group is configured for the licensed band 202. DRX parameters are defined for each of the two groups and the values of the DRX parameters may, but need not, differ depending on traffic conditions. In the example of FIG. 2, the durations of the drx-onDurationTimer and the drx-InactivityTimer are different between the unlicensed band 201 and the licensed band 202 (illustrated as "drx-onDurationTimer1" and the "drx-InactivityTimer1" for the unlicensed band 201 and drx-onDurationTimer2" and the "drx-InactivityTimer2" for the unlicensed band 202). In comparison, the duration of the DRX cycle is the same. In other words and during a DRX cycle, the UE stays awake for a longer duration in the unlicensed band 201 relative to the licensed band 202, as shown with the durations of the drx-onDurationTimer. Further, upon receiving DL traffic or transmitting UL traffic at a slot near the end of the drx-onDurationTimer, the UE extends its awake state for a longer duration in the unlicensed band 201 relative to the licensed band 202, as shown with the durations of the drx-InactivityTimer. Other configurations of the two DRX groups are possible and are further described herein below.

Figure 3:
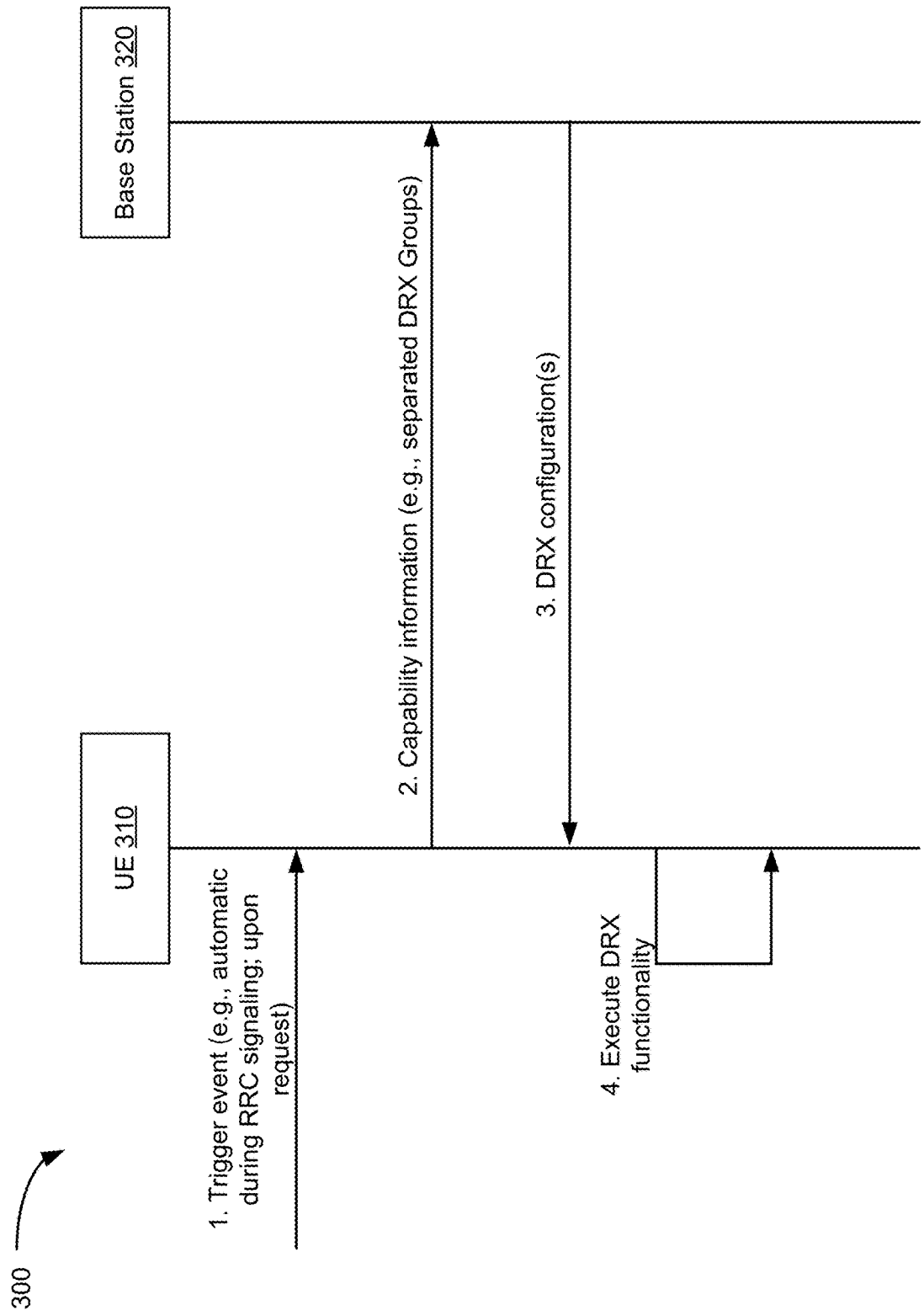
FIG. 3 illustrates an example of signaling to indicate a capability of supporting DRX groups for licensed and unlicensed bands in accordance with some embodiments.

FIG. 3 illustrates an example of signaling 300 to indicate a capability of supporting DRX groups for licensed and unlicensed bands in accordance with some embodiments. The unlicensed band is an example of the unlicensed band 201 of FIG. 2. The licensed band is an example of the licensed band 202 of FIG. 2. A UE 310, such as the UE 104 of FIG. 1, signals its capability to support a separated DRX group for the unlicensed band to a base station 320, such as the gNB 108 of FIG. 1.

In an example, upon a trigger event, the UE 310 transmits capability information to the base station 320. In response, the base station 320 transmits DRX configuration(s) to the UE 310. In turn, the UE 310 executes a DRX functionality per band depending on the DRX configuration of the band's DRX group.

Different types of the trigger event are possible. For instance, RRC signaling between the UE 310 and the base station 320 is used to provide the radio access to the UE 310. RRC messages, including RRC Connection Setup or RRC ConnectionReconfiguration, can be used to configure DRX per DRX group. In this illustration, the trigger event can be any of the RRC messages, whereby the UE 310 automatically reports its capability information as part of the RRC signaling. In another illustration, the base station 320 may send a request to the UE 310 to reports its capability information. In this illustration, the trigger event includes the receipt of the request.

Generally, the capability information indicates the capability of the UE 310 to support a first DRX group in association with the unlicensed band and a second DRX group in association with the licensed band (e.g., separated DRX groups). Different options are possible to implement the capability information.

In a first example option, the capability information is a generic capability indication of supported a separated DRX group for all CCs of the unlicensed band (e.g., all NR-U CCs). For instance, the capability information includes a bit, where a first binary value of the bit (e.g., a "1") indicates that the UE 310 supports a DRX group specifically defined for the unlicensed band, and where a second binary value of the bit (e.g., a "0") indicates otherwise.

In a second example option, the capability information is more granular. In particular, the capability information is a capability indication of supporting a separated DRX group for a specific band combination (BC) of licensed CCs and unlicensed CCs. In this option, multiple band combinations may exist. For instance, licensed band "A" and a licensed band "C" may be available (e.g., may belong to FR1), where "A" and "C" are the indexes of these two licensed bands. An unlicensed band "B" (e.g., may belong to FR1), where "B" is the index of the unlicensed band. A first band combination of the licensed band "A" and the unlicensed "B" may exist. Similarly, a second band combination of the licensed band "C" and the unlicensed "B" may exist. The UE 310 may support a separated DRX group for an unlicensed CC "X" (e.g., NR-U CC "X," where "X" is the identifier (ID) of the NRU-CC) when "X" is in the first band combination and "X" is on the unlicensed band "B." In comparison, UE 310 may not support a separated DRX group for an unlicensed CC "X" (e.g., NR-U CC "X") when "X" is in the second band combination and "X" is on the unlicensed band "B." The capability information may indicate supporting the separated DRX group for the unlicensed CC "X" when "X" is in the first band combination and "X" is on the unlicensed band "B." Additionally or alternatively, the capability information may indicate not supporting the separated DRX group for the unlicensed CC "X" when "X" is in the second band combination and "X" is on the unlicensed band "B." To do so, the capability information may include first information to indicate its support of a separated DRX group for the unlicensed band and additional information that identifies the band combination and specific unlicensed band CC(s). For instance, the first information includes a bit, where a first binary value of the bit (e.g., a "1") indicates that the UE 310 supports a DRX group specifically defined for the unlicensed band, and where a second binary value of the bit (e.g., a "0") indicates otherwise. The additional information includes second information that identifies the band combination (e.g., one or more bits set to identify the band indexes of the combination) and third information that identifies the specific unlicensed band CC(s) (e.g., one or more bits set to identify the CC index (indices)).

If the first DRX group and the second DRX group are the same or if the DRX configuration of the two DRX groups are the same, the base station 320 may send the DRX configuration that is applicable to both the DRX groups. However, if a value is different between the DRX parameters of the two DRX groups, the base station 320 sends two DRX configurations, one per DRX group. In this case, different options exist. In a first example option, the value for each parameter in a DRX group is sent. In a second example option, the value(s) that is(are) common between the DRX groups are sent once, rather than twice. The value(s) that is(are) specific to each DRX group is also sent. In this way, the amount of DRX configuration signaling can be reduced.

Generally, the first and second DRX groups may have different DRX configurations, where at least one value of a DRX parameter differs between the two DRX groups. The base station 320 can configure each DRX group (e.g., set the values of the DRX parameters) depending on multiple factors related to the DRX group including, for instance, conditions of traffic (e.g., buffering, queuing, etc.) on the corresponding band or set of CCs. Different options also exist.

In a first example option applicable to Scenario B and Scenario E, any parameter in a separated DRX configuration (e.g., any value of a DRX parameter set for the separated DRX configuration for NR-U CC(s)) can be different from the DRX configuration in the licensed CG (cell group), including any of: drx-onDurationTimer, drx-Inactivity-Timer, drx-HARQ-RTT-TimerDL, drx-HARQ-RTT-TimerUL, drx-RetransmissionTimerDL, drx-RetransmissionTimerUL, drx-LongCycleStartOffset, drx-ShortCycle, drx-ShortCycleTimer, drx-SlotOffset. In a second example option to Scenario B and Scenario E, no more than a maximum number (e.g., two) of parameter can have different values between the two DRX configurations. For instance, only drx-onDurationTimer and drx-Inactivity-Timer in the separated DRX configuration can be different from the DRX configuration in the licensed CG.

In a first example option applicable to Scenario A, any parameter in a separated DRX configuration (e.g., any value of a DRX parameter set for the separated DRX configuration for NR-U CC(s)) can be different from the DRX configuration in the licensed PCell/Scell, including any of: drx-onDurationTimer, drx-InactivityTimer, drx-HARQ-RTT-TimerDL, drx-HARQ-RTT-TimerUL, drx-RetransmissionTimerDL, drx-RetransmissionTimerUL, drx-LongCycleStartOffset, drx-ShortCycle, drx-ShortCycleTimer, drx-SlotOffset. In a second example option to Scenario A, no more than a maximum number (e.g., two) of parameter can have different values between the two DRX configurations. For instance, only drx-onDurationTimer and drx-InactivityTimer in the separated DRX configuration can be different from the DRX configuration in the licensed PCell/SCell.

As described above, the UE 310 also executes the DRX functionality per band depending on the applicable DRX configuration. The DRX functionality includes transitioning between a sleep mode and an awake mode, where timing and other parameters of such modes are set by the values of the DRX parameters. Executing the DRX functionality can also include a UE behavior, where no interruption between resources of the licensed band and the unlicensed band is assumed. An approach to avoid the interruption is further illustrated in FIG. 7.

The capability of supporting the separated DRX group for the unlicensed band may exist when the UE 310 has a first set of resources (e.g., physical layer resources) for radio access using the unlicensed band and a second set of resources (e.g., also physical layer resources) for radio access using the licensed band, where the first set and the second set are separate of each other. For instance, each of the two sets of resources can include separate antenna panel(s), RF chain(s), and baseband processor(s). Although the two sets of resources are separate, an interruption can occur when a change to the use of one set impacts the use of the other set. To illustrate, a voltage controlled oscillator (VCO) may be used between the two sets for phase locked loops, frequency synthesizers, function generators, etc. Upon deactivating the first set of resources (e.g., powering off the RF chain used in the unlicensed band) in support of the sleep mode of the UE 310 on the unlicensed band, the deactivation may trigger a readjustment of the VCO for the second set of resources (e.g., the other RF chain used in the licensed band), thereby causing an interruption to this second set at that time. As further described in connection with FIG. 7, the interruption may be avoided by aligning the transition to the sleep mode for both the unlicensed band and the licensed band.

Figure 4:
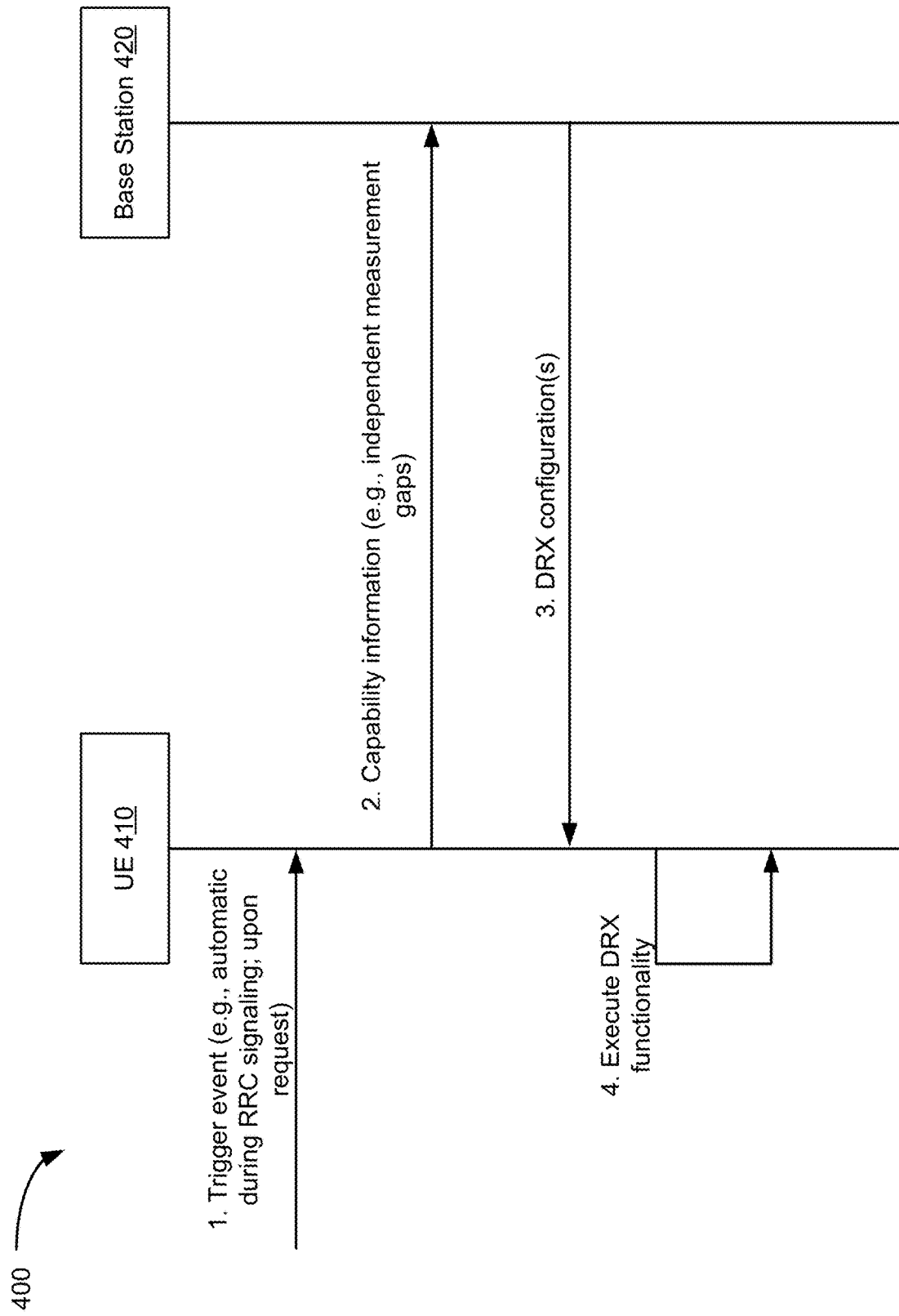
FIG. 4 illustrates another example of signaling to indicate a capability of supporting DRX groups for licensed and unlicensed bands in accordance with some embodiments.

FIG. 4 illustrates another example of signaling 400 to indicate a capability of supporting DRX groups for licensed and unlicensed bands in accordance with some embodiments. The signaling is similar to that of FIG. 3, where, upon a trigger event, a UE 410 transmits capability information to a base station 420. In response, the base station 420 transmits DRX configuration(s) to the UE 410. In turn, the UE 410 executes a DRX functionality per band depending on the DRX configuration of the band's DRX group. The similarities are not repeated herein in the interest of brevity and the description of FIG. 3 applies hereto. However, rather than indicating the capability of the UE 410 to support a first DRX group in association with an unlicensed band and a second DRX group in association with a licensed band (e.g., separated DRX groups), the capability information indicates the capability of the UE 410 to support independent measurement gaps between the licensed band and the unlicensed band.

A measurement gap can be used by the UE 410 to perform measurements on cells, such as to identify and measure intra-frequency cells, inter-frequency cells and/or inter-RAT E-UTRAN cells. When the UE 410 includes separate sets of resources for radio access (e.g., physical layer resources including antenna panel(s), RF chain(s), and baseband processor(s)), independent measurement gap patterns can be defined for the UE 410 such that the UE 410 can perform independent measurements on the cells by using its separate sets of resources.

Additionally, when the separate sets of resources are available to the UE 410, the UE 410 has the capability of supporting separated DRX groups. In particular, if the UE 410 is operating on dual connectivity of licensed CC(s) and unlicensed CC(s) and the UE 410 can support independent measurement gaps for this dual connectivity combination, then that directly means that the UE 410 can support a separated DRX group for NR-U CC(s) in this case.

By indicating its capability of supporting independent measurement gaps, the UE 410 implicitly indicates its capability of supporting separated DRX groups. In other words, upon receiving capability information from the UE 410 indicating that the UE 410 supports the independent measurement gaps, the base station 420 can determine that the UE 410 also supports the capability of separated DRX groups.

Accordingly, in the illustration of FIG. 4, the capability information sent from the UE 410 to the base station 420 indicates that the UE 410 can support independent measurement gaps between the licensed band and the unlicensed band. In an example, the capability information includes a bit, where a first binary value of the bit (e.g., a "1") indicates that the UE 410 supports the between the licensed band and the unlicensed band (e.g., can support an independent measurement gap for NR-U of FR1), and where a second binary value of the bit (e.g., a "0") indicates otherwise.

Figure 5:
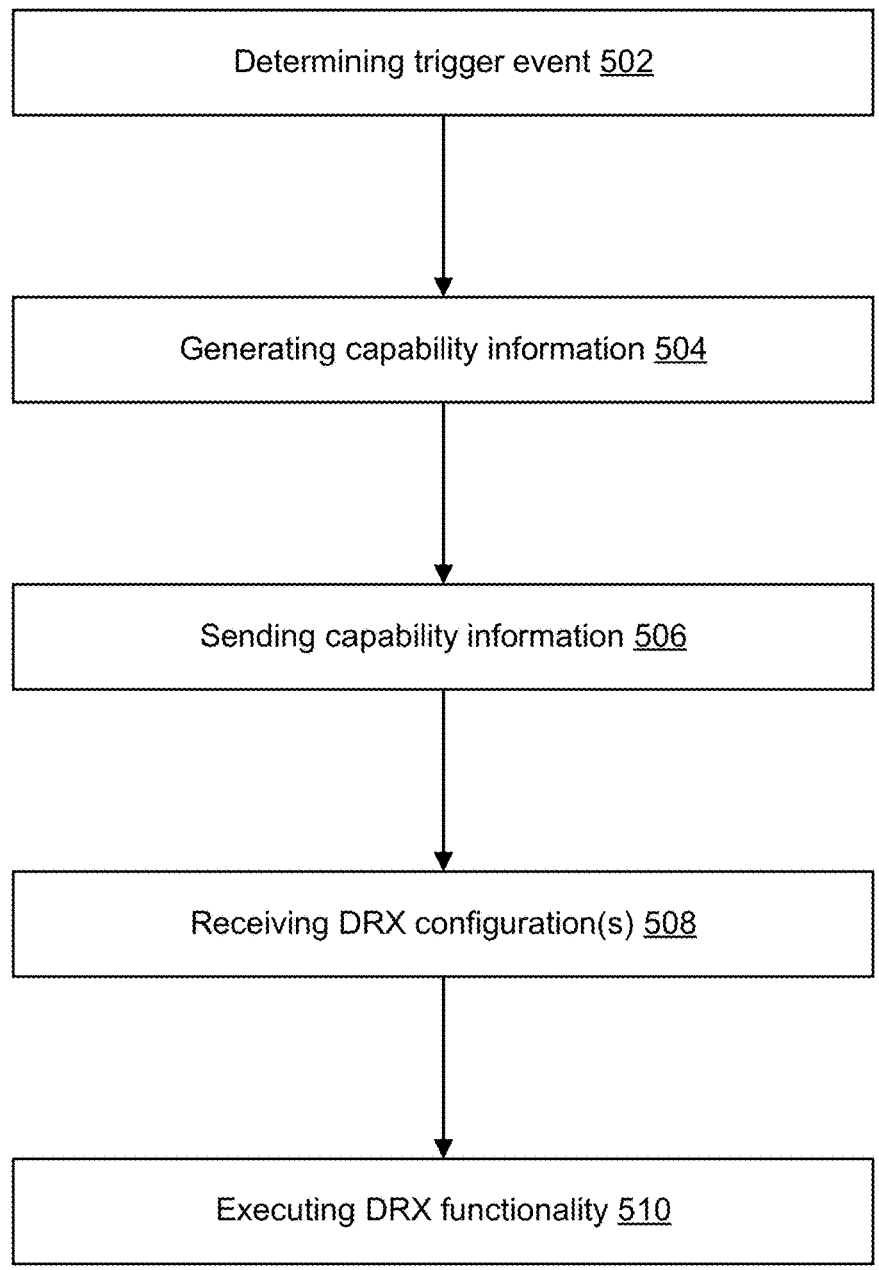
FIG. 5 illustrates an example of an operational flow/algorithmic structure that a UE can implement to indicate its capability of supporting DRX groups for licensed and unlicensed bands in accordance with some embodiments.

FIG. 5 illustrates an example of an operational flow/algorithmic structure 500 that a UE can implement to indicate its capability of supporting DRX groups for licensed and unlicensed bands in accordance with some embodiments. The operation flow/algorithmic structure 500 may be performed or implemented by the UE such as, for example, the UE 104, 310, 410, or 1000; or components thereof, for example, processors 1004.

The operation flow/algorithmic structure 500 may include, at 502, determining a trigger event. In some embodiments, a trigger event may relate to RRC signaling, where the UE may automatically report its capability to support separated DRX groups, including a DRX group for an unlicensed band (e.g., NR-U of FR1), and/or to support independent measurements gaps, including the support of an independent measurement gap for the unlicensed band. In some embodiments, a trigger event may include a request from a base station to the UE for reporting any or both of these capabilities.

The operation flow/algorithmic structure 500 may further include, at 504, generating capability information. In some embodiments, the capability information indicates the UE's capability to support the separated DRX groups and/or the UE's capability to support the independent measurements gaps. As explained herein above, such capabilities can be available when the UE includes a first set of resources using the licensed band of a first RAT (e.g., NR RAT) and a second set of resources UE using the unlicensed band of the first RAT or a second RAT (e.g., LTE RAT). Accordingly, the capability information can be generated based on the first set of resources and the second set of resources. The timing for generating the capability information can vary. In an example, the capability information is generated before RRC signaling. In another example, the capability information is generating during the RRC signaling in support of the automatic reporting. In yet another example, the capability information is generated in response to the base station's request for reporting the capability(ies).

The operation flow/algorithmic structure 500 may further include, at 506, sending the capability information. In some embodiments, the UE sends the capability information to the base station. The capability information can be sent based on the trigger event and can be included in one or more RRC messages or in one or more other messages specific to reporting the capability(ies) (e.g., response message(s) to the base station's request).

The operation flow/algorithmic structure 500 may further include, at 508, receiving DRX configuration(s). In some embodiments, the UE receives the DRX configuration(s) from the base station. A DRX configuration is associated with a DRX group. If the DRX configurations are the same for the separated DRX groups, the UE may receive a single DRX configuration. Otherwise, the UE may receive different DRX configurations.

The operation flow/algorithmic structure 500 may further include, at 510, executing a DRX functionality. In some embodiment, the UE uses the DRX configuration (e.g., transitions between a sleep mode and an awake mode) on each of the bands according to the corresponding DRX configuration. The UE can also implement an approach to avoid interruptions between the licensed band and the unlicensed band, where the approach may involve aligning DRX active time windows as further described in FIGS. 7 and 8.

Figure 6:
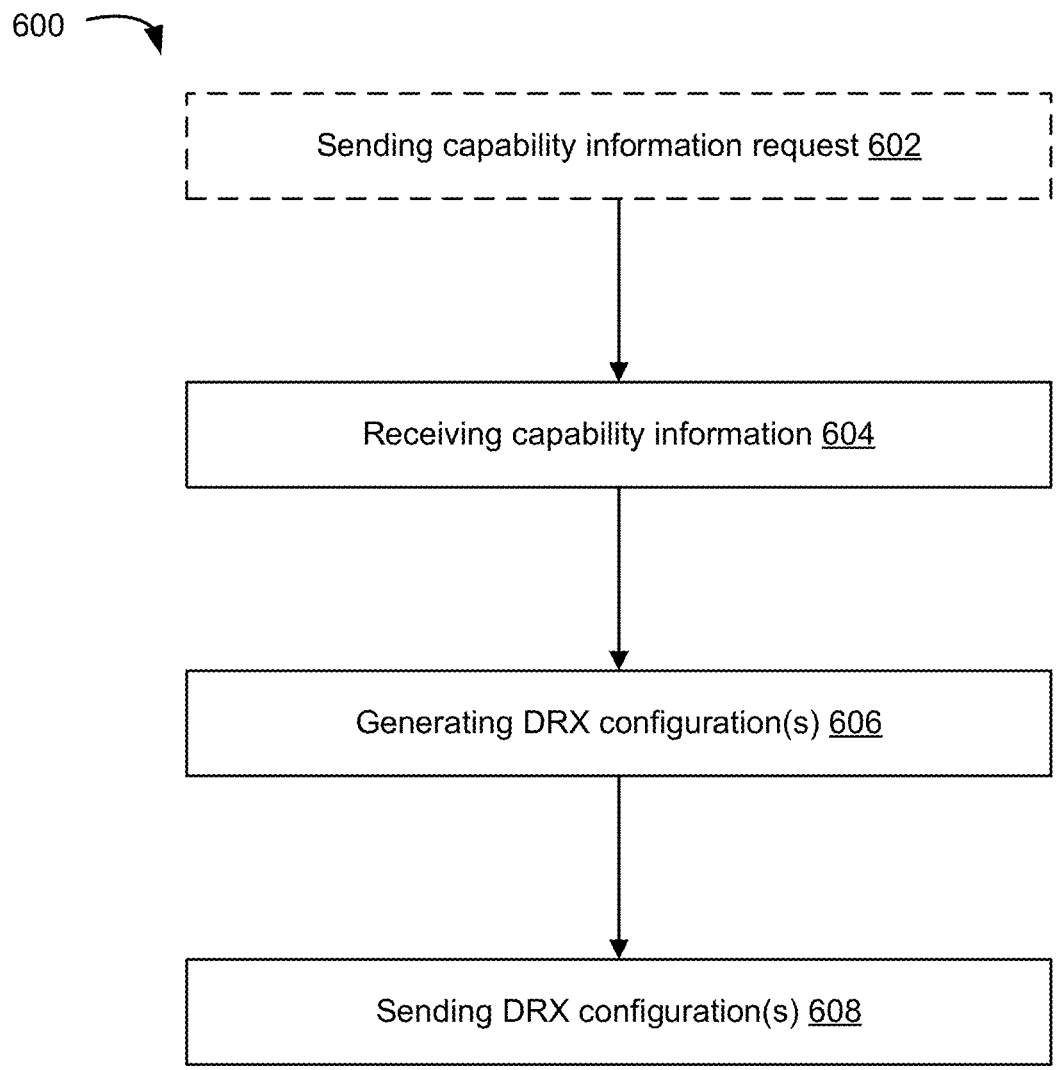
FIG. 6 illustrates an example of an operational flow/algorithmic structure that a base station can implement to configure DRX parameters for DRX groups in accordance with some embodiments.

FIG. 6 illustrates an example of an operational flow/algorithmic structure 600 that a base station can implement to configure DRX parameters for DRX groups in accordance with some embodiments. The operation flow/algorithmic structure 600 may be performed or implemented by the base station such as, for example, the gNB 108, the base station 112, the base station 320, the base station 430, or the gNB 1100; or components thereof, for example, processors 1104.

The operation flow/algorithmic structure 600 may include, at 602, sending a capability information request. In some embodiments, the base station sends such a request to a UE, such that the UE can report its capability to support separated DRX groups, including a DRX group for an unlicensed band (e.g., NR-U of FR1), and/or to support independent measurements gaps, including the support of an independent measurement gap for the unlicensed band. In some embodiments, such a request is not sent, as illustrated with the dashed box in FIG. 6.

The operation flow/algorithmic structure 600 may further include, at 604, receiving capability information. In some embodiments, the base station receives such information from the UE in response to the capability information request. In some embodiments, the base station receives such information from the UE automatically during RRC signaling. The capability information indicates the UE's capability to support the separated DRX groups and/or the UE's capability to support the independent measurements gaps.

The operation flow/algorithmic structure 600 may further include, at 606, generating DRX configuration(s). In some embodiments, the base station decides on whether the separated DRX groups should be used, which may be based on the indicated support capability. Further, the base station sets the values of the different DRX parameters. Different factors may be used including, for instance, traffic conditions. A DRX configuration is associated with a DRX group. If the DRX configurations are the same for the separated DRX groups, the base station may generate a single DRX configuration. Otherwise, the base station may generate different DRX configurations.

The operation flow/algorithmic structure 600 may further include, at 608, sending the DRX configuration(s). In some embodiments, the base station sends the generated DRX configuration(s) to the UE.

Figure 7:
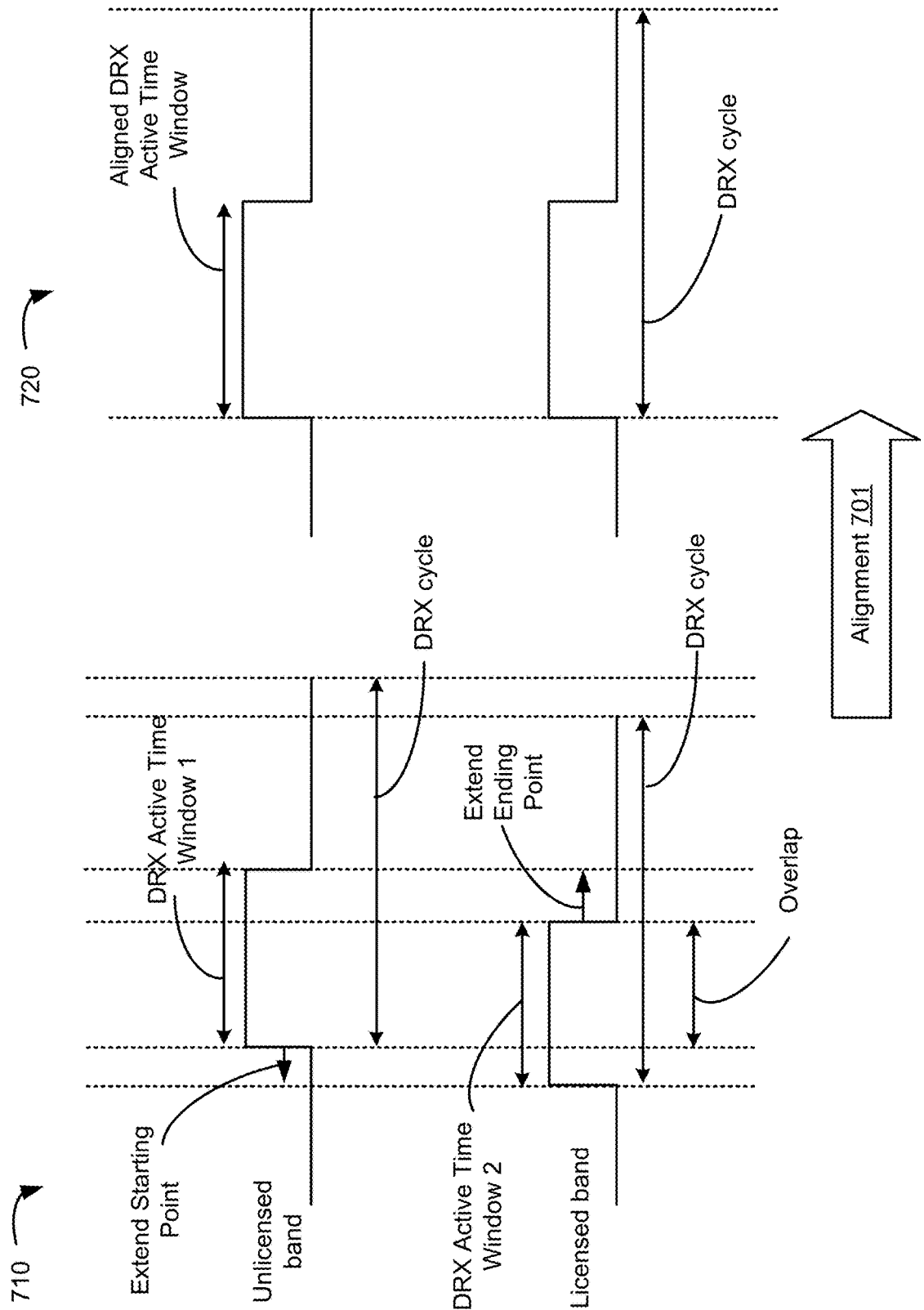
FIG. 7 illustrates an example of a UE behavior related to aligning DRX cycles in accordance with some embodiments.

FIG. 7 illustrates an example of a UE behavior related to aligning DRX cycles in accordance with some embodiments. Here, a UE supports separated DRX groups for licensed and unlicensed bands and receives DRX configurations that are different between the DRX groups. Interruptions related to a DRX functionality may occur when there is an overlap, partial or full, between DRX active time windows, unless a particular approach to the UE behavior is followed. An alignment 701 of the DRX active time windows is an example of a UE behavior that avoids the interruptions.

As illustrated in FIG. 7, DRX configurations 710 for an unlicensed band and a licensed band are shown prior to the alignment 701 and include an overlap of DRX active time windows. The overlap triggers the alignment 701. A result 720 of the alignment 701 is also shown and includes a DRX cycle in which the DRX active time windows are aligned for both bands. When receiving and/or transmitting data using the licensed band and the unlicensed band during this DRX cycle, the reception and/or transmission can occur during the aligned DRX active time window. Conversely, if there was no overlap, the alignment 701 may not be performed and the DRX active time windows need not be aligned.

A DRX active time window is a time interval during which the UE remains in the awake mode. For example, the duration of the DRX active time window can be equal to the value of the drx-onDurationTimer and, if extended due to UL or DL traffic, the value of the drx-InactivityTimer. The DRX active time window starts at a starting point and ends at an ending point, and the time difference between the starting point and the ending point is equal to the duration of the DRX active time window.

An overlap between a first DRX active time window of the unlicensed band (illustrated as "DRX Active Time Window 1") and a second DRX active time window of the licensed band (illustrated as "DRX Active Time Window 2") occurs when either: (i) the first starting point of the first DRX active time window and the second starting point of the second DRX active time window are the same but the first ending point of the first DRX active time window and the second ending point of the second DRX active time window are different (e.g., when the two DRX active time windows start at the same time, but end at different times); (ii) the first starting point and the second starting point are different, but the first ending point and the second ending point are the same (e.g., when the two DRX active time windows start at different times but end at the same time); or (iii) the first starting point and the second starting point are different, the first ending point and the second ending point are different, but the starting point or ending point of one of the two DRX active time windows occur during the other DRX active window. If the first starting point and the second starting point are the same and the first ending point and the second ending point are the same, the two DRX active windows are already aligned and the alignment 701 need not be performed.

The alignment 701 includes extending one or both of the DRX active time windows such that their starting points align (e.g., occur at the same time) and their ending points align. For example, the earliest of the first starting point and the second starting point is set as the starting point of the aligned DRX active time window. The latest of the first ending point and the second ending point is set as the ending point of the aligned DRX active time window.

In the illustration of FIG. 7, the second starting point is the earliest starting point. Accordingly, the first DRX time window is extended to the left (as shown with the left arrow marked as "extend starting point"). This extension indicates that the awake state of the UE will start earlier on the unlicensed band relative to if the alignment 701 was not performed. Similarly, the first ending point is the latest ending point. Accordingly, the second DRX time window is extended to the right (as shown with the right arrow marked as "extend ending point"). This extension indicates that the UE will remain in the awake state on the licensed band for a longer duration relative to if the alignment 701 was not performed.

An extension time duration is the difference between the timing of a starting point (or ending point) before and after the alignment 701. Referring back to the illustration of FIG. 7, a first extension time duration is defined for the first DRX active time window as the time difference between the second starting point and the first starting point. Similarly, a second extension time duration is defined for the second DRX active time window as the time difference between the first ending point and the second ending point.

The extension time duration on a band corresponds to a time interval during which the UE was supposed to be in the sleep mode but, because of the alignment 701, was in the awake mode instead to avoid interruption between the set of resources used on both bands (e.g., antenna panels, RF chains, baseband processors, etc.). The interruption may be avoiding by keeping active all the set or only the necessary subset of the resources. For instance, during the first extension time duration, the antenna panel and the RF chain used for the unlicensed band may remain powered on, whereas the baseband processor used for the unlicensed band may be deactivated (e.g., powered off or put in a standby mode). Similarly, during the second extension time duration, the antenna panel and the RF chain used for the licensed band main remain powered on, whereas the baseband processor used for the licensed band may be deactivated. Alternatively, the relevant antenna panel, RF chain, and baseband processors can remain powered on in both cases.

In a first illustrative example of scenario B and Scenario E, the licensed band and the unlicensed band correspond to a NR licensed CG and a NR unlicensed CG, respectively. In this example, no interruption is expected or implemented between the NR licensed CG and the NR unlicensed CG when different DRXs are configured. If the NR-U DRX active time is overlapped (partially or fully overlapped) with the NR licensed DRX active time, the UE may align the starting point of these DRXs and align the ending point of these DRXs. In this case, aligning the starting point of these DRXs means that the UE will change from DRX inactive status to DRX active status at the same time point for both NR-U and NR licensed CGs. Aligning the ending point of these DRXs means UE will change from DRX active status to DRX inactive status at the same time point for both NR-U and NR licensed CGs.

In a second illustrative example of scenario B and Scenario E, if the UE cannot support independent measurement gaps for NR-U, the approach of the above first illustrative example applies. However, if the UE can support independent measurement gaps for NR-U, the UE can follow the separated timeline in each DRX group to change the active/inactive status (e.g., no alignment may be performed). This can be the case because the set of resources are truly independent of each other and interruption may not occur because of this independence.

In a first illustrative example of scenario A, the licensed band and the unlicensed band correspond to a NR licensed PCell/SCell and a NR unlicensed SCell, respectively. No interruption is expected or implemented between the NR licensed PCell/SCell and the NR unlicensed SCell when different DRXs are configured. If the NR-U DRX active time is overlapped (partially or fully overlapped) with the NR licensed DRX active time, the UE may align the starting point of these DRXs and align the ending point of these DRXs. Aligning the starting point of these DRXs means the UE will change from DRX inactive status to DRX active status at the same time point for both NR-U and NR licensed serving cells. Aligning the ending point of these DRXs means the UE will change from DRX active status to DRX inactive status at the same time point for both NR-U and NR licensed serving cells.

In a second illustrative example of scenario A, if the UE cannot support independent measurement gaps for NR-U, the approach of the above first illustrative example applies. However, if the UE can support independent measurement gaps for NR-U, the UE can follow the separated timeline in each DRX group to change the active/inactive status (e.g., no alignment may be performed). This can be the case because the set of resources are truly independent of each other and interruption may not occur because of this independence.

Figure 8:
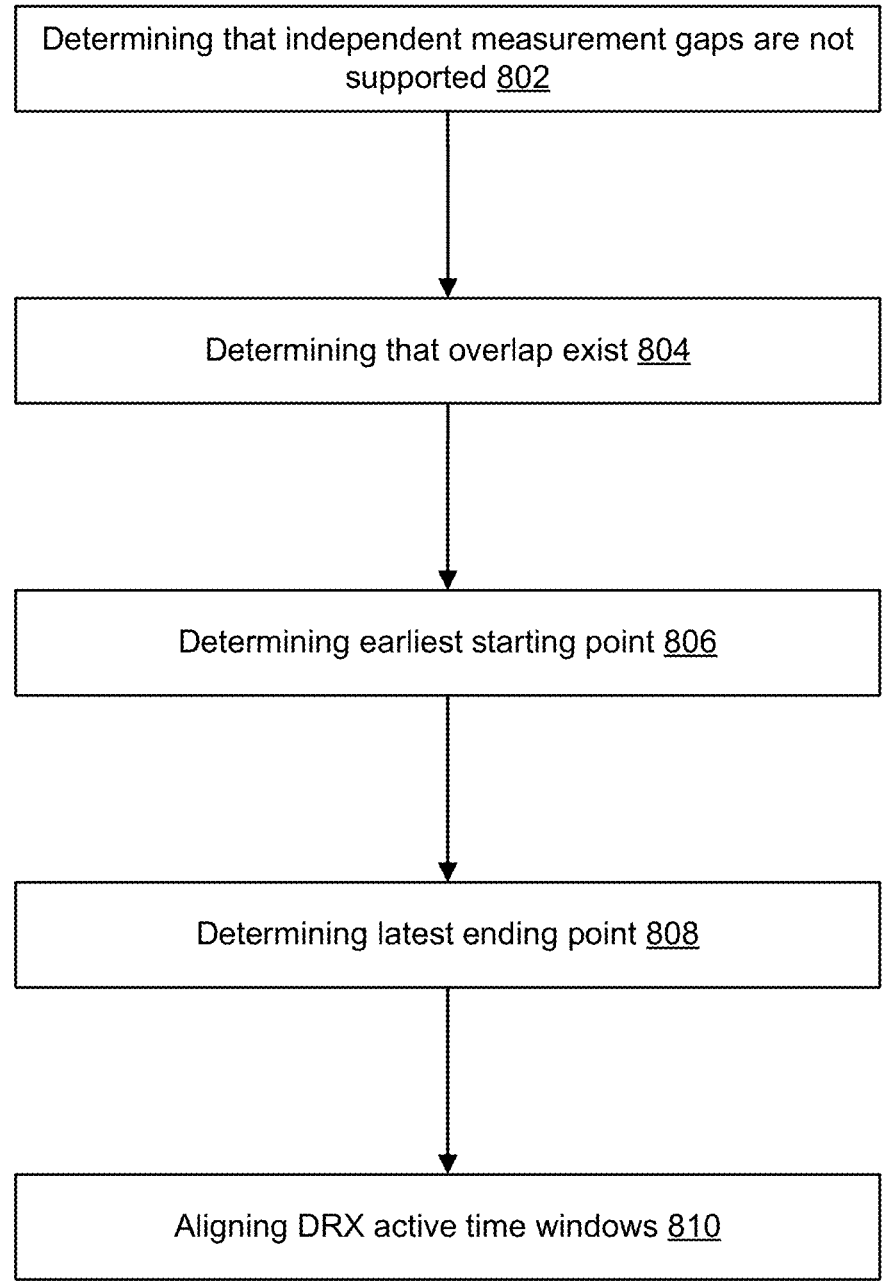
FIG. 8 illustrates an example of an operational flow/algorithmic structure that a UE can implement to align DRX cycles in accordance with some embodiments.

FIG. 8 illustrates an example of an operational flow/algorithmic structure 800 that a UE can implement to align DRX cycles in accordance with some embodiments. The operation flow/algorithmic structure 800 may be performed or implemented by the UE such as, for example, the UE 104, 310, 410, or 1000; or components thereof, for example, processors 1004.

The operation flow/algorithmic structure 800 may include, at 802, determining that independent measurement gaps are not supported. In some embodiments, if the UE supports independent measurement gaps, the set of resources used for radio access using an unlicensed band and a licensed band are truly independent of each other. Accordingly, the UE supports separated DRX groups, where a first DRX group can have a first DRX configuration for the licensed band, and where a second DRX group can have a second DRX configuration for the unlicensed band. In this case, no interruption may occur between the resources, even when an overlap exists between DRX active windows defined by the two DRX configurations. Accordingly, remaining operations of the operation flow/algorithmic structure 800 need not be performed. Otherwise, the remaining operations are performed based on the determination that the UE does not support independent measurement gaps for the unlicensed band and the licensed band.

The operation flow/algorithmic structure 800 may further include, at 804, determining that an overlap exist between DRX active time windows of the DRX groups. In some embodiments, the first DRX configuration defines a first DRX active window having a first starting point and a first ending point. Likewise, the second DRX configuration defines a second DRX active window having a second starting point and a second ending point. Partial or full overlap may depend on the timing of the first starting point, the second starting point, the first ending point, and the second ending point as described in connection with FIG. 7. If no overlap exists, the UE need not align the two DRX active windows. Otherwise, remaining operations of the operation flow/algorithmic structure 800 are performed.

The operation flow/algorithmic structure 800 may further include, at 806, determining the earliest starting point. In some embodiments, the UE may compare the timing of the first starting point with the timing of the second starting point. The starting point that has the earliest timing is selected as a starting point of an aligned DRX active window.

The operation flow/algorithmic structure 800 may further include, at 808, determining the latest ending point. In some embodiments, the UE may compare the timing of the first ending point with the timing of the second ending point. The ending point that has the latest timing is selected as an ending point of the aligned DRX active window.

The operation flow/algorithmic structure 800 may further include, at 810, aligning the DRX active time windows of the unlicensed band and the licensed band. In some embodiments, the UE extends one or both DRX active time windows such that the two DRX active windows have the same starting point (e.g., the earliest starting point) and the same ending point (e.g., the latest ending point) and correspond to the aligned DRX active time window. During an extension time duration, the relevant set of resources can remain active (e.g., by extending the first DRX active time window, the antenna panel, RF chain, and baseband processor used for the unlicensed band remain powered on). Alternatively, only the relevant subset of resources can remain active (e.g., by extending the first DRX active time window, the antenna panel, and RF chain used for the unlicensed band remain powered on, but the baseband processor used for the unlicensed band is deactivated).

Figure 9:
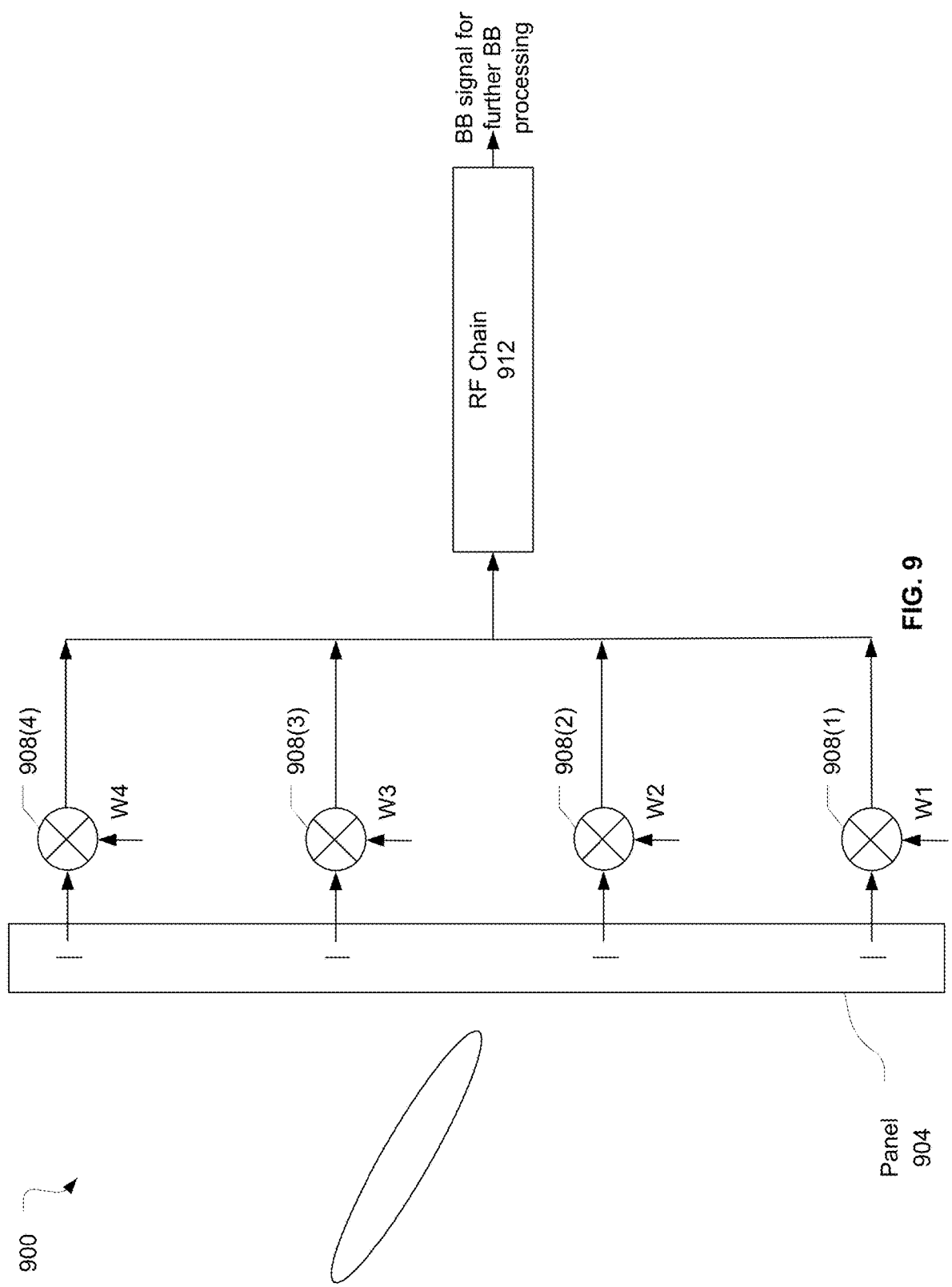
FIG. 9 illustrates an example of receive components in accordance with some embodiments.

FIG. 9 illustrates receive components 900 of the UE 104 in accordance with some embodiments. The receive components 900 may include an antenna panel 904 that includes a number of antenna elements. The panel 904 is shown with four antenna elements, but other embodiments may include other numbers.

The antenna panel 904 may be coupled to analog beamforming (BF) components that include a number of phase shifters 908(1)-908(4). The phase shifters 908(1)-908(4) may be coupled with a radio-frequency (RF) chain 912. The RF chain 912 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 908(1)-908(4) to provide a receive beam at the antenna panel 904. These BF weights may be determined based on the channel-based beamforming.

Further, and as described herein above, a UE may include multiple sets of resources for radio access, where these sets are separate. Referring to FIG. 9, a set of such resources can include any or a combination of an antenna panel 904, phase shifters 908(1)-908(4), an RF chain 912, and/or components thereof.

Figure 10:
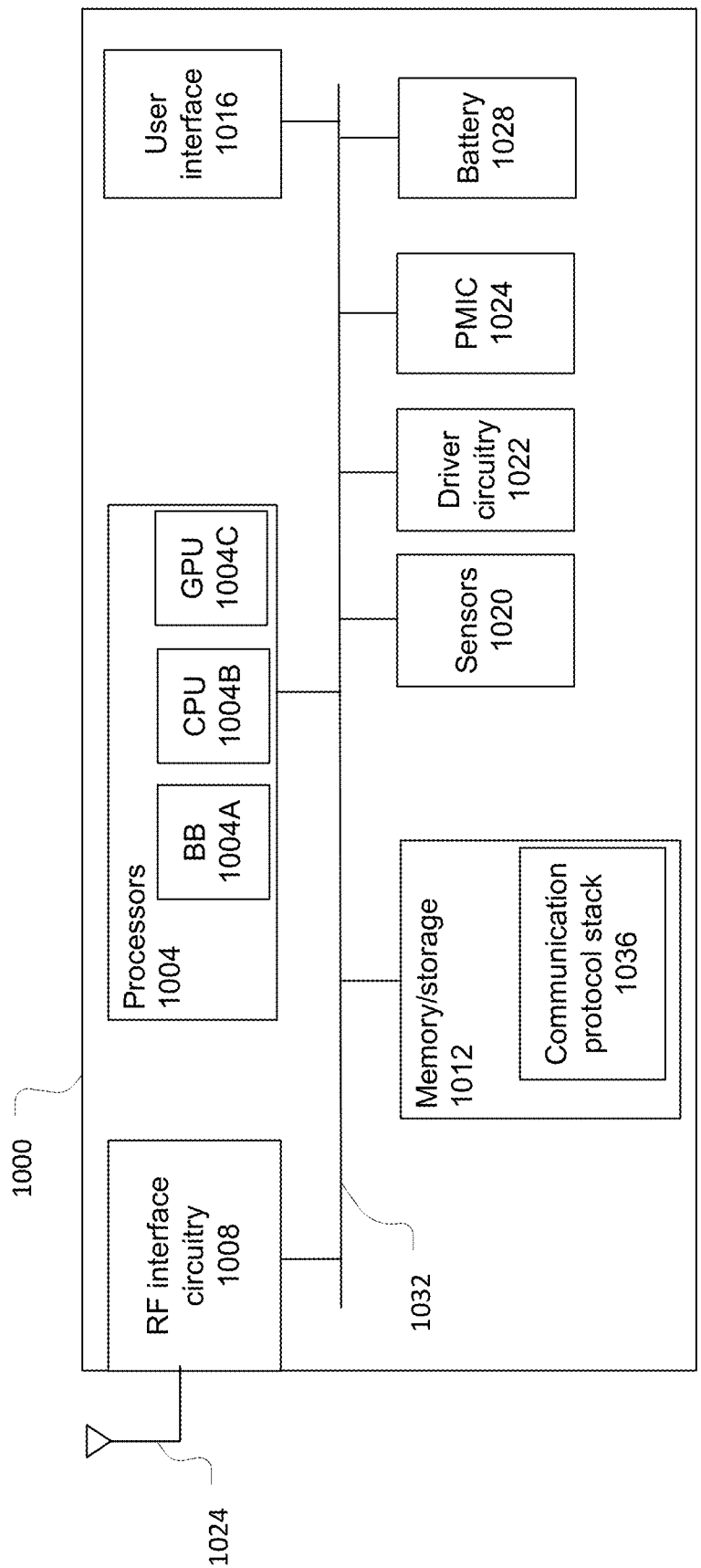
FIG. 10 illustrates an example of a UE in accordance with some embodiments.

FIG. 10 illustrates a UE 1000 in accordance with some embodiments. The UE 1000 may be similar to and substantially interchangeable with UE 104 of FIG. 1.

Similar to that described above with respect to UE 104, the UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a reduced capacity UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 1004A may also access group information 1024 from memory/storage 1012 to determine search space groups in which a number of repetitions of a PDCCH may be transmitted.

The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1024 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1024.

In various embodiments, the RF interface circuitry 1008 may be configured to transmit/receive signals in a manner compatible with NR access technologies.

The antenna 1024 may include a number of antenna elements that each convert electrical signals into radio waves to travel through the air and to convert received radio waves into electrical signals. The antenna elements may be arranged into one or more antenna panels. The antenna 1024 may have antenna panels that are omnidirectional, directional, or a combination thereof to enable beamforming and multiple input, multiple output communications. The antenna 1024 may include microstrip antennas, printed antennas fabricated on the surface of one or more printed circuit boards, patch antennas, phased array antennas, etc. The antenna 1024 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Further, and as described herein above, a UE may include multiple sets of resources for radio access, where these sets are separate. Referring to FIG. 10, a set of such resources can include any or a combination of an RF interface circuitry 1008, a BB 1004A, and/or components thereof.

Figure 11:
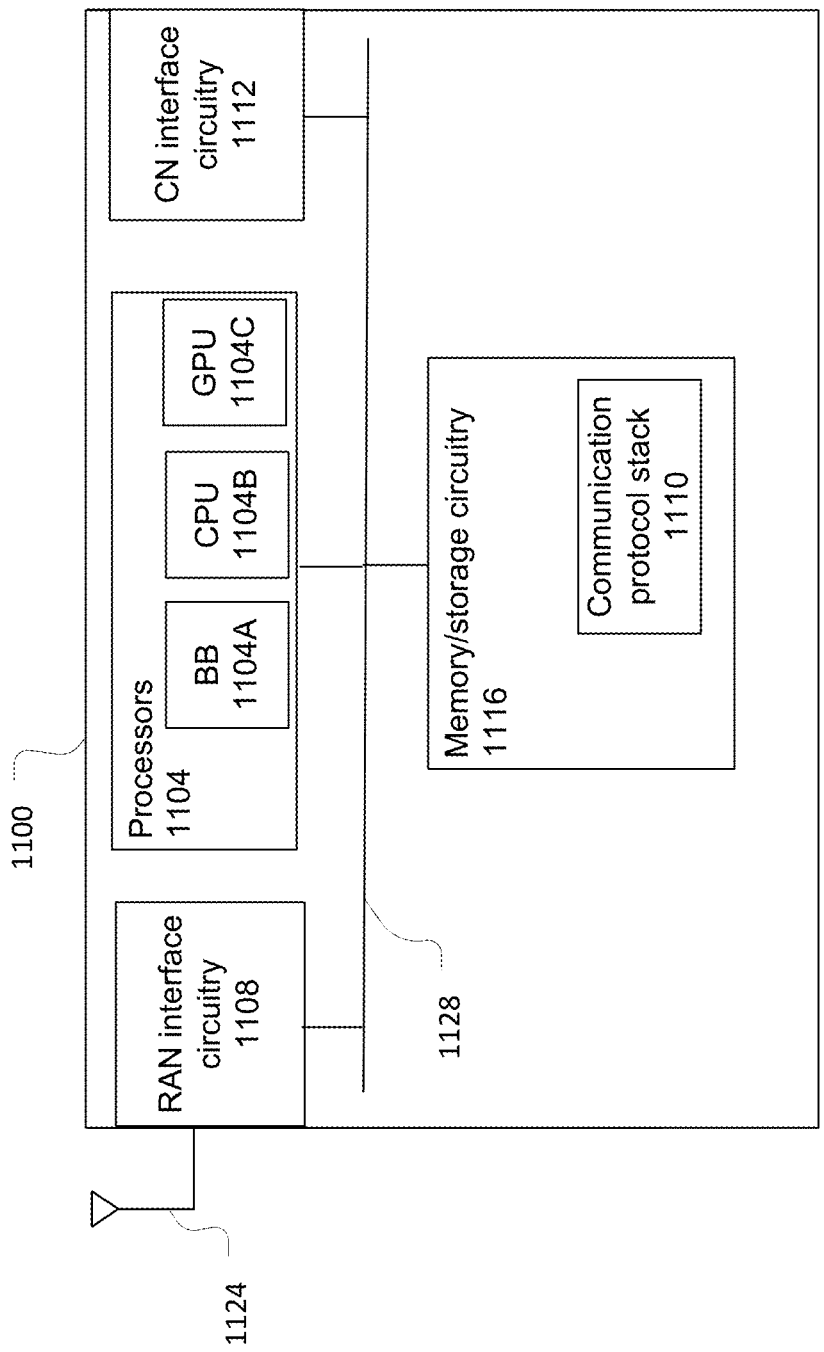
FIG. 11 illustrates an example of a base station in accordance with some embodiments.

FIG. 11 illustrates a gNB node 1100 in accordance with some embodiments. The gNB node 1100 may similar to and substantially interchangeable with gNB 108. A base station, such as the base station 112, can have the same or similar components as the gNB 1100.

The gNB 1100 may include processors 1104, RF interface circuitry 1108, core network (CN) interface circuitry 1112, and memory/storage circuitry 1116.

The components of the gNB 1100 may be coupled with various other components over one or more interconnects 1128.

The processors 1104, RF interface circuitry 1108, memory/storage circuitry 1116 (including communication protocol stack 1110), antenna 1124, and interconnects 1128 may be similar to like-named elements shown and described with respect to FIG. 10.

The CN interface circuitry 1112 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method comprising: based on a first set of resources of a user equipment (UE) using a licensed band of a first radio access technology (RAT) and on a second set of resources of the UE using an unlicensed band of the first RAT or a second RAT, generating capability information indicating at least one: (i) capability of the UE to support a first discontinuous reception (DRX) group in association with the licensed band and a second DRX group in association with the unlicensed band, or (ii) capability of the UE to support independent measurement gaps between the licensed band and the unlicensed band; sending the capability information to a base station; and receiving, from the base station based on the capability information, a first DRX configuration associated with the licensed band and a second DRX configuration associated with the unlicensed band.

Example 2 includes a method comprising: sending, to a base station, capability information indicating at least one: (i) capability of a UE to support a first discontinuous reception (DRX) group in association with a licensed band of a first RAT and a second DRX group in association with an unlicensed band of the first RAT or a second RAT, or (ii) capability of the UE to support independent measurement gaps between the licensed band and the unlicensed band; and receiving, from the base station based on the capability information, a first DRX configuration associated with the licensed band and a second DRX configuration associated with the unlicensed band.

Example 3 includes a method comprising: receiving, from a UE, capability information indicating at least one: (i) capability of the UE to support a first discontinuous reception (DRX) group in association with a licensed band of a first RAT and a second DRX group in association with an unlicensed band of the first RAT or a second RAT, or (ii) capability of the UE to support independent measurement gaps between the licensed band and the unlicensed band; and sending, to the UE based on the capability information, a first DRX configuration associated with the licensed band and a second DRX configuration associated with the unlicensed band.

Example 4 includes the method of any of examples 1 to 3, wherein the licensed band is a Long-Term Evolution (LTE) licensed band, wherein the unlicensed band is a new radio unlicensed band (NR-U), and wherein the UE supports dual connectivity between the LTE licensed band and the NR-U.

Example 5 includes the method of any of examples 1 to 3, wherein the licensed band is an uplink licensed band, and wherein the unlicensed band is an unlicensed band of a new radio (NR) cell.

Example 6 includes the method of any of examples 1 to 3, wherein the licensed band is a new radio (NR) licensed band, wherein the unlicensed band is a new radio unlicensed band (NR-U), and wherein the UE supports carrier aggregation between the NR licensed band and the NR-U.

Example 7 includes the method of any of examples 1 to 6, wherein the capability information indicates that the UE supports the second DRX group for all unlicensed component carriers of the unlicensed band.

Example 8 includes the method of any of examples 1 to 6, wherein the capability information indicates that the UE supports the first DRX group and the second DRX group for a specific band combination of licensed component carriers of the licensed band and unlicensed component carriers of the unlicensed band.

Example 9 includes the method of example 8, wherein the capability information indicates an unlicensed component carrier of the unlicensed band.

Example 10 includes the method of example 8, wherein the capability information indicates that the UE does not support the second DRX group in association with an unlicensed component carrier of the unlicensed band in a different band combination.

Example 11 includes the method of any of examples 1 to 6, wherein the capability information indicates that the UE supports independent measurement gaps between a set of licensed serving component carriers and a set of unlicensed serving component carriers.

Example 12 includes the method of any of examples 1 to 6, wherein the capability information comprises first information indicating a support by the UE of at least two separate DRX groups, and second information indicating at least one of: (i) the support for all new radio unlicensed band (NR-U) component carriers, or (ii) the support for a band combination of licensed component carriers and unlicensed component carriers.

Example 13 includes the method of example 12, wherein the capability information comprises third information indicating a support by the UE of the independent measurement gaps.

Example 14 includes the method of any of examples 1 to 6, wherein the capability information comprises first information indicating a support by the UE of the independent measurement gaps, and second information indicating at least one of: (i) the support for all new radio unlicensed band (NR-U) component carriers, or (ii) the support for a band combination of licensed component carriers and unlicensed component carriers.

Example 15 includes the method of any of examples 1 to 14, wherein at least one DRX parameter is different between the first DRX group and the second DRX group.

Example 16 includes the method of example 15, wherein the at least one DRX parameter is one of drx-onDurationTimer, drx-InactivityTimer, drx-HARQ-RTT-TimerDL, drx-HARQ-RTT-TimerUL, drx-RetransmissionTimerDL, drx-RetransmissionTimerUL, drx-LongCycleStartOffset, drx-ShortCycle, drx-ShortCycleTimer, drx-SlotOffset.

Example 17 includes the method of any of examples 1 to 14, wherein at most two DRX parameters are different between the first DRX group and the second DRX group.

Example 18 includes the method of example 17, wherein the two DRX parameters are drx-onDurationTimer and drx-InactivityTimer.

Example 19 includes the method of any of examples 1 to 18, wherein the method further comprises: determining, based on the first DRX configuration and the second DRX configuration, an overlap between a first DRX active time window associated with the licensed band and a second DRX active time window associated with the unlicensed band; and aligning, based on the overlap, at least one of (i) a first starting point or of the first DRX active time window and a second starting point of the second DRX active time window, or (ii) a first ending point or of the first DRX active time window and a second ending point of the second DRX active time window.

Example 20 includes the method of claim 19, wherein the aligning comprises: determining that the first starting point is earlier than the second starting point, and changing the second DRX active time window to start at the first starting point, wherein the first starting point corresponds to a change from a DRX inactive status to a DRX active status.

Example 21 includes the method of claim 19, wherein the aligning comprises: determining that the first ending point is later than the second starting point, and changing the second DRX active time window to end at the first ending point, wherein the first ending point corresponds to a change from a DRX active status to a DRX inactive status.

Example 22 includes the method of claim 20, wherein between the second ending point and the first end point, the UE is configured to deactivate a radio frequency (RF) chain used in association with the unlicensed band and maintain active a baseband processor used in association with the unlicensed band.

Example 23 includes the method of claim 19, wherein the aligning comprises changing the first DRX time active window or the second DRX time active window such that the first DRX time window and the second DRX time window start at a same starting point and/or end at a same ending point, wherein the starting point corresponds to a change from a DRX inactive status to a DRX active status, and wherein the ending point corresponds to a change from a DRX active status to a DRX inactive status.

Example 24 includes the method of claim 19, wherein the capability information indicates the capability of the UE to support the first DRX group and the second DRX group, wherein the method further comprises: based on the UE not supporting the independent measurement gaps, aligning at least one of (i) a first starting point or of the first DRX active time window and a second starting point of the second DRX active time window, or (ii) a first ending point or of the first DRX active time window and a second ending point of the second DRX active time window.

Example 25 includes the method of example 24, wherein the aligning comprises any of the examples 20-23.

Example 26 includes the method of any of examples 1-25, wherein the capability information is sent automatically during RRC signaling or in response to a request of the base station for the capability information.

Example 27 includes a UE comprising means to perform one or more elements of a method described in or related to any of the examples 1-2 and 4-26.

Example 28 includes one or more non-transitory computer-readable media comprising instructions to cause a UE, upon execution of the instructions by one or more processors of the UE, to perform one or more elements of a method described in or related to any of examples 1-2 and 4-26.

Example 29 includes a UE comprising logic, modules, or circuitry to perform one or more elements of a method described in or related to any of the examples 1-2 and 4-26.

Example 30 includes a UE comprising: one or more processors and one or more computer-readable media comprising instructions that, when executed by the one or more processors, cause the one or more processors to perform one or more elements of a method described in or related to any of the examples 1-2 and 4-26.

Example 31 includes a base station comprising means to perform one or more elements of a method described in or related to any of the examples 3-18 and 26.

Example 32 includes one or more non-transitory computer-readable media comprising instructions to cause a base station, upon execution of the instructions by one or more processors of the base station, to perform one or more elements of a method described in or related to any of examples 3-18 and 26.

Example 33 includes a base station comprising logic, modules, or circuitry to perform one or more elements of a method described in or related to any of the examples 33-18 and 26.

Example 34 includes a base station comprising: one or more processors and one or more computer-readable media comprising instructions that, when executed by the one or more processors, cause the one or more processors to perform one or more elements of a method described in or related to any of the examples 3-18 and 26.

Example 31 includes a system comprising means to perform one or more elements of a method described in or related to any of the examples 1-26.

Example 32 includes one or more non-transitory computer-readable media comprising instructions to cause a system, upon execution of the instructions by one or more processors of the system, to perform one or more elements of a method described in or related to any of examples 1-26.

Example 33 includes a base station comprising logic, modules, or circuitry to perform one or more elements of a method described in or related to any of the examples 1-26.

Example 34 includes a system comprising: one or more processors and one or more computer-readable media comprising instructions that, when executed by the one or more processors, cause the one or more processors to perform one or more elements of a method described in or related to any of the examples 1-26.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method implemented by a user equipment (UE), the method comprising:
generating, based on a first set of resources of the UE using a licensed band of a first radio access technology (RAT) and on a second set of resources of the UE using an unlicensed band of the first RAT or a second RAT, capability information indicating capability of the UE to support a first discontinuous reception (DRX) group in association with the licensed band and a second DRX group in association with the unlicensed band and to support at least one of: all new radio unlicensed band (NR-U) component carriers or a band combination of licensed component carriers and unlicensed component carriers;
sending the capability information to a base station; and
receiving, from the base station based on the capability information, a first DRX configuration associated with the licensed band and a second DRX configuration associated with the unlicensed band.

2. The method of claim 1, wherein the licensed band is a Long-Term Evolution (LTE) licensed band, wherein the unlicensed band is a new radio unlicensed band (NR-U), and wherein the UE supports dual connectivity between the LTE licensed band and the NR-U.

3. The method of claim 1, wherein the licensed band is an uplink licensed band, and wherein the unlicensed band is an unlicensed band of a new radio (NR) cell.

4. The method of claim 1, wherein the licensed band is a new radio (NR) licensed band, wherein the unlicensed band is a new radio unlicensed band (NR-U), and wherein the UE supports carrier aggregation between the NR licensed band and the NR-U.

5. The method of claim 1, wherein the capability information indicates that the UE supports the second DRX group for all unlicensed component carriers of the unlicensed band.

6. The method of claim 1, wherein the capability information indicates that the UE supports the first DRX group and the second DRX group for a specific band combination of licensed component carriers of the licensed band and unlicensed component carriers of the unlicensed band.

7. The method of claim 6, wherein the capability information indicates an unlicensed component carrier of the unlicensed band.

8. The method of claim 6, wherein the capability information indicates that the UE does not support the second DRX group in association with an unlicensed component carrier of the unlicensed band in a different band combination.

9. The method of claim 1, wherein the capability information further indicates that the UE supports independent measurement gaps between a set of licensed serving component carriers and a set of unlicensed serving component carriers.

10. A user equipment (UE) comprising:
one or more processors; and
one or more non-transitory computer-readable media comprising instructions that, when executed by the one or more processors, configure the UE to:
send, to a base station, capability information indicating capability of the UE to support a first discontinuous reception (DRX) group in association with a licensed band of a first RAT and a second DRX group in association with an unlicensed band of the first RAT or a second RAT and to support at least one of: all new radio unlicensed band (NR-U) component carriers or a band combination of licensed component carriers and unlicensed component carriers; and receive, from the base station based on the capability information, a first DRX configuration associated with the licensed band and a second DRX configuration associated with the unlicensed band.

11. The UE of claim 10, wherein at least one DRX parameter is different between the first DRX group and the second DRX group or at most two DRX parameters are different between the first DRX group and the second DRX group.

12. The UE of claim 10, wherein execution of the instructions further configures the UE to:
determine, based on the first DRX configuration and the second DRX configuration, an overlap between a first DRX active time window associated with the licensed band and a second DRX active time window associated with the unlicensed band; and
align, based on the overlap, at least one of (i) a first starting point or of the first DRX active time window and a second starting point of the second DRX active time window, or (ii) a first ending point or of the first DRX active time window and a second ending point of the second DRX active time window.

13. The UE of claim 12, wherein the aligning comprises:
determining that the first starting point is earlier than the second starting point, and changing the second DRX active time window to start at the first starting point, wherein the first starting point corresponds to a change from a DRX inactive status to a DRX active status.

14. The UE of claim 12, wherein the aligning comprises:
determining that the first ending point is later than the second starting point, and
changing the second DRX active time window to end at the first ending point, wherein the first ending point corresponds to a change from a DRX active status to a DRX inactive status.

15. The UE of claim 12, wherein the aligning comprises:
changing the first DRX time active window or the second DRX time active window such that the first DRX time window and the second DRX time window start at a same starting point and/or end at a same ending point, wherein the starting point corresponds to a change from a DRX inactive status to a DRX active status, and wherein the ending point corresponds to a change from a DRX active status to a DRX inactive status.

16. The UE of claim 12, wherein execution of the instructions further configures the UE to:
based on the UE not supporting independent measurement gaps between the licensed band and the unlicensed band, align at least one of (i) a first starting point or of the first DRX active time window and a second starting point of the second DRX active time window, or (ii) a first ending point or of the first DRX active time window and a second ending point of the second DRX active time window.

17. One or more non-transitory computer-readable media comprising instructions that, when executed on a system, configure the system to perform operations comprising:
receiving, from a user equipment (UE), capability information indicating capability of the UE to support a first discontinuous reception (DRX) group in association with a licensed band of a first RAT and a second DRX group in association with an unlicensed band of the first RAT or a second RAT and to support at least one of: all new radio unlicensed band (NR-U) component carriers or a band combination of licensed component carriers and unlicensed component carriers; and
sending, to the UE based on the capability information, a first DRX configuration associated with the licensed band and a second DRX configuration associated with the unlicensed band.

18. The one or more non-transitory computer-readable media of claim 17, wherein the capability information comprises first information indicating a support by the UE of at least two separate DRX groups, and second information indicating at least one of:(i) supporting the all NR-U component carriers, or (ii) supporting the band combination of licensed component carriers and unlicensed component carriers.

19. The one or more non-transitory computer-readable media of claim 18, wherein the capability information comprises third information indicating a support by the UE of independent measurement gaps between the licensed band and the unlicensed band.

20. The one or more non-transitory computer-readable media of claim 17, wherein the capability information comprises first information indicating a support by the UE of independent measurement gaps between the licensed band and the unlicensed band, and second information indicating at least one of: (i) supporting the all NR-U component carriers, or (ii) supporting the band combination of licensed component carriers and unlicensed component carriers.

* * * * *